United States Patent

Maatuk

[11] Patent Number: 5,908,985
[45] Date of Patent: Jun. 1, 1999

[54] MICROPROCESSOR-BASED LIQUID SENSOR AND ICE DETECTOR

[76] Inventor: Josef Maatuk, 1207 S. Holt #3, L. A., Calif. 90035

[21] Appl. No.: 08/703,002

[22] Filed: Aug. 26, 1996

Related U.S. Application Data

[63] Continuation of application No. 08/414,239, Mar. 31, 1995, Pat. No. 5,730,026.
[51] Int. Cl.⁶ .............................. G01F 23/00; G01N 25/00
[52] U.S. Cl. ................................................. 73/295; 374/54
[58] Field of Search .............................. 73/295; 374/16, 374/54, 45; 340/580, 581

[56] References Cited

U.S. PATENT DOCUMENTS

| | | |
|---|---|---|
| 2,279,043 | 4/1942 | Harrington . |
| 3,279,252 | 10/1966 | Barlow . |
| 5,730,026 | 3/1998 | Maatuk ..................................... 73/295 |

FOREIGN PATENT DOCUMENTS

| | | | |
|---|---|---|---|
| 20 35 154 | 12/1977 | Germany ................................. 374/16 |
| 6116 | 1/1981 | Japan ........................................ 73/295 |
| 158522 | 9/1982 | Japan ........................................ 73/295 |
| 281167 | 10/1993 | Japan ......................................... 374/16 |
| WO 91/14926 | 10/1991 | WIPO .................................... 73/295 |

*Primary Examiner*—Richard Chilcot
*Assistant Examiner*—Willie Morris Worth

[57] ABSTRACT

Apparatus and a method of operating any structural configuration of a heater and array of temperature sensors to measure with high accuracy, the level of stratified liquids like water and oil or water and gasoline and non-stratified liquids, liquid temperature, other liquid properties and detect ice formation on aircraft surfaces. Thin and narrow strips of dissimilar material will be used for the heater, array of temperature sensors, mount, and coating. The connecting wires to and from the apparatus will be from the same material. Simultaneous measurements from all the temperature sensors, before and after heat is applied, will be used to generate accurate temperature profiles for the entire configuration and not just from two adjacent temperature sensors. Different features of the temperature profiles will determine accurately the liquid level, liquid temperature and other liquid properties. Apparatus of the invention may also be used to detect ice-formation.

1 Claim, 5 Drawing Sheets

MICROPROCESSOR-BASED LIQUID SENSOR AND ICE DETECTOR

This application is a continuation of application Ser. No. 08/414,239 filed Mar. 31, 1995, now U.S. Pat. No. 5,730,026.

REFERENCE CITED

U.S. PATENT DOCUMENTS

U.S. Pat. No. 2,279,043 April 1942 Harrington - - - 073/295

U.S. Pat. No. 3,279,252 October 1966 Barlow - - - 073/295

U.S. Pat. No. 4,969,749 November 1990 Hasselman - - - 073/295

FOREIGN PATENT DOCUMENTS

14926 October 1991 WO - - - 073/295

44923 March 1980 Japan - - - 073/295

158522 September 1982 Japan - - - 073/295

DESCRIPTION OF THE PRIOR ART

Present Liquid Level measuring devices that are similar to this invention utilize a resistive type probe and rely on the change of resistivity of the probe with temperature. A significant decrease in the resistivity of the probe over its value when it was measured in air indicates that the probe is submerged in liquid. Devices that rely on change in resistivity are usually only capable of determining whether or not a certain level, such as the location of the probe, is reached. Even when several probes are used, liquid levels can only be determined at discrete locations of the probe. Intermediate levels between two probes can not be determined Resistive probes are only accurate at the temperatures in which they are calibrated. They need to be re-calibrated at other operating temperatures. Furthermore, resistive probes usually require compensating resistors or circuits, resulting in a network that is susceptible to electromagnetic interference or electrical noise from other electrical/electronic equipment within its vicinity.

This invention precludes the shortcomings inherent in liquid level devices employing resistive probes, because actual temperature are used and processed, and the temperatures measured are dependent on heat transfer mechanisms rather than change in resistivity of the probe material. Furthermore, the invention is capable of not only determining liquid level at discrete points where the temperature sensors are located, but can also measure liquid levels at intermediate points between two temperature sensor locations, which the resistive type device is incapable of doing.

SUMMARY OF THE INVENTION

The invention described herein is a means of measuring the level of a liquid in a liquid container such as a fuel tank by means of a probe to which heat is applied and the temperature along the length of the probe is measured. This invention makes use of the difference in cooling efficiency between liquid and gas such as air, or between two different liquids, such as water and oil. When heat is applied to the probe, the temperature of the portion of the probe submerged in liquid is significantly lower than the temperature of that portion of the probe outside of the liquid and typically exposed to air. This is because the liquid removes heat at faster rate than air, so that the temperature difference between the surface of the probe is much lower in liquid than it is in air. This is also true between a liquid that removes heat more efficiently, such as water, and a liquid that does not remove heat as efficiently, such as oil. Temperature sensors, such as thermocouples or thermistors that are attached to various points on the probe measure the temperatures at those respective locations on the probe. This invention is not only capable of determining where the liquid level is at discrete points where the temperature sensors are attached, it can also determine where the liquid level is between two discrete points to within a fraction of centimeter accuracy, when precision temperature measurement devices are used in conjunction with suitable microprocessor, which process the signals received from the temperature sensors.

Figure 1:
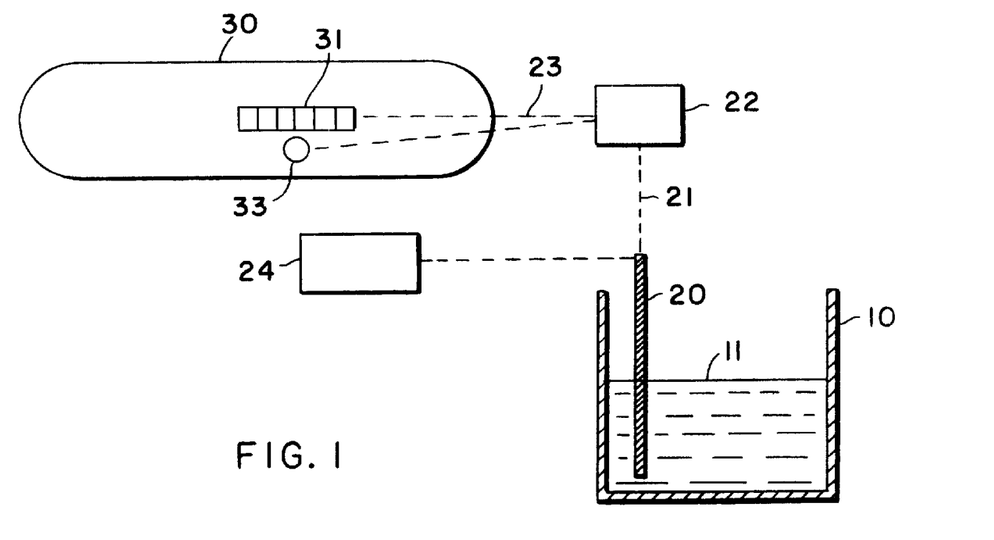
FIG. 1 is a schematics of a typical liquid level measuring device application.

The purpose of this invention is to provide a device that can measure liquid levels, such as that of fuel in an automobile fuel tank or lubrication oil level in an automobile engine compartment fairly accurately and with minimal effort, such as simply pushing a button on an instrument panel, as shown in FIG. 1. The advantages of this invention are (1) It can measure liquid levels accurately, within a fraction of a centimeter; (2) It requires a very small amount of power to operate; (3) It is compact and light weight and can be installed in relatively small liquid containers if necessary; (4) It is reliable since it has no moving parts; (5) because it requires a very small power for operation, it does not generate any significant amount of electromagnetic energy which could interfere with the performance of other electrical/electronic equipment; and (6) with certain modifications to the device, it can be used to measure other important liquid parameters such as viscosity and density. This device can also be adopted for the. detection of ice formation on the external surface of an aircraft, such as the external surface of an aircraft wing or fuel tank.

DETAILED DESCRIPTION OF THE INVENTION

An (optionally) heated sensing strip (may be wire or ribbon or etc.) instrumented with thermal sensing taps formed (e.g.) by lead wires of a material dissimilar to the sensing strip (e.g. a Constantan strip with Copper lead wires). The strip may be heated directly (e.g. flowing a current through the Constantan material when not measuring the therompotentials) or indirectly (e.g. laminating an isolated heater over the sensing strip to form independent heating and measuring processes) to image the heat flow characteristics along the strip. Equally, the strip may be used as a passive sensor in applications where, for instance, the thermal striations along the strip are of interest.

The packaging and materials, and the locations of the thermal sensing taps, are engineered to properly sample the thermal gradients along the strip. An analog profile of the temperature along the strip is reconstructed from these samples, and this analog profile may be processed to accurately discern levels, layers, properties (like viscosity), etc. in the stripes environment.

The instrumentation electronics need only be capable of microvolt measurements, plus analog or digital processing as appropriate to the application. Scanning the taps in sequence may be used to transform the spatial information into the time domain for simple analog filtering to reconstruct the profile, and thresholding circuits for decisions. Equally, digitizing the data from the sensing taps allows digital processing, possibly for more elaborate signature analysis, for ease of recalibration, etc. Output circuits and format may be whatever is appropriate to the application (erg. digital dashboard, analog level meters, warning lights, etc.).

Using the reading from all the point sensors to make discrete decisions as to (for instance) a level are easy to make based simply on comparing the individual measurements to each other. For an environment where the fluids (or whatever is being tested) have substantially dissimilar properties (e.g. air/water), the data also readily supports simple interpolation between points, with increasing accuracy requiring increasing the accuracy of resolving the end-points and increasing the complexity of the interpolation algorithm.

Substantial improvement in the decision accuracy is obtained by incorporating the data from multiple points, rather than just the two points on either side of the fluid boundary. By using many data points to fit the profile along the strip, the accuracy of the overall curve is improved beyond the accuracy of single measurements, the individual measurement uncertainties tend to average out. Further, the fitting of multiple points to a model that incorporates the effects of different fluid characteristics and heat inputs allows substantial improvements in discerning boundaries between fluids that are more closely matched in properties (erg. water/oil) and in discerning the properties of the fluids themselves (e.g. viscosity).

A typical application of the liquid level measuring apparatus is measuring the liquid level of fuel in an automobile fuel tank or lubrication oil level in an automobile engine compartment. A schematic diagram of such an application is shown in FIG. 1. The schematic diagram in FIG. 1 depicts an automobile engine oil pan 10 containing lubrication oil 11. The liquid level sensor probe 20 is installed inside the oil pan 10. A plurality of electrical wires 21 connect the probe 20 to a data acquisition circuit that is connected to a microprocessor 22 which may be located in the engine compartment of the automobile or behind the automobile instrument panel 30 or very close to the probe. The microprocessor is in turn connected by one or more wires 23 to a display 31 located on the automobile instrument panel 30. The data acquisition circuit and the microprocessor is situated with respect to the probe as appropriate for the noise and cabling constraints of the application environment. A pulsed power supply 24 made of one or two batteries or AC is located either in the engine compartment, behind the automobile instrument panel or close to the probe and electrically connected to the microprocessor 22, the probe 21 and an activation button or switch 33 located on the automobile control panel, provides pulsed electrical energy to the liquid level sensing system. Sensing of the lubrication oil level is accomplished by activating the button or switch 33, sending pulsed electrical energy to the probe 20 and the microprocessor 22. The lubrication oil level is displayed on the display 31.

Figure 2:
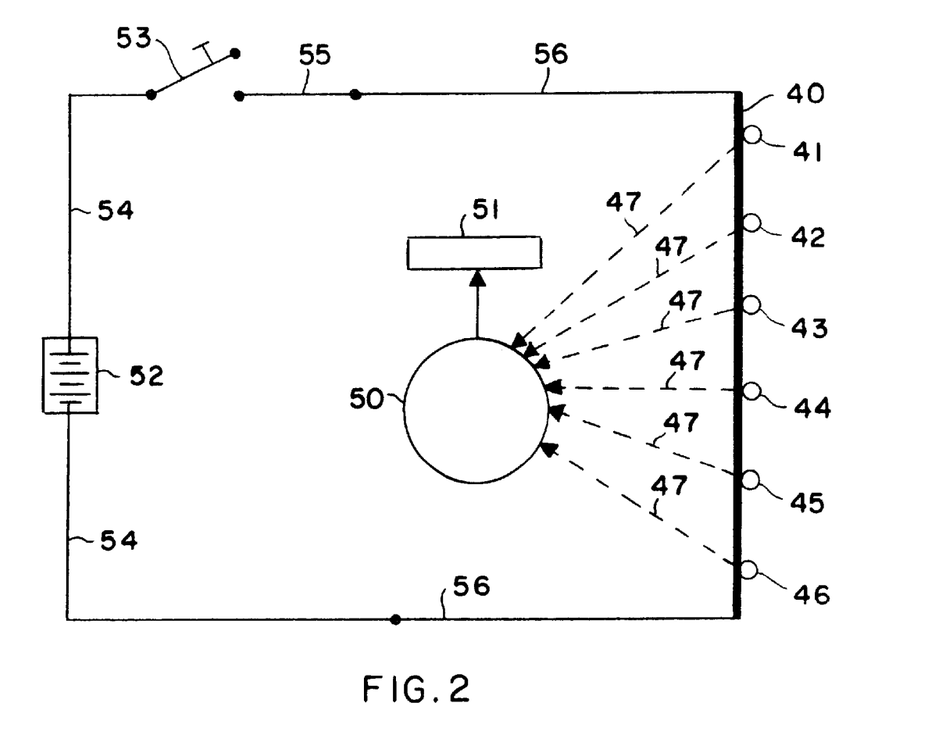
FIG. 2 is a schematic diagram of one embodiment of the invention

The apparatus makes use of the cooling efficiency between liquid and gas, such as air, or between two different liquids such as water and oil. One embodiment of the invention is depicted schematically in FIG. 2. The embodiment depicted schematically in FIG. 2 is comprised of a probe 40 made from 0.002 inch diameter Nichrome wire three inches in length but maybe of any suitable lengths, a data acquisition circuitry and a microprocessor 50, a display 51, an electrical power source 52, a switch 53, electrical wires 54 and, connecting wires 56. Six plurality of thermocouples beads 41, 42, 43, 44, 45 and 46 from 0.008 inch diameter or Copper-Constantan pairs of wires are attached to the probe 40 by wrapping the probe Nichrome wire around the thermocouples beads 41 through 46. The number of thermocouples beads may be varied depending on the length of the probe and the accuracy desired. The thermocouples 41 through 46 are electrically connected to the data acquisition circuitry by a Copper-Constantan wires 47 of suitable size and length. The probe 40 is coated with an insulative material to electrically isolate it from the thermocouples beads 41 through 46.

Referring again to FIG. 2, when the switch 53 is in the open position and no power is applied to the probe 40, the temperature of the thermocouples 41 through 46 will measure the same temperature as the media which surrounds the probe, either air or liquid or both. When the switch 53 is in the closed position, a pulsed current flows through the circuit including the probe and heat is generated at the probe 40 in the form of $I^{2R}$ losses. The heat generated at the probe 40 is dissipated to the surrounding medium In order for heat to be dissipated to the surrounding medium the temperature of the probe has to be higher than that of the surrounding medium. At steady-state condition, that is when the temperatures have stabilized some time after the switch 53 is closed, usually several seconds, the characteristics temperature difference between the medium and the probe 40 is established. For example, if 6.0 milliwatts of power is applied to the probe and the entire probe is in air which is maintained at a constant temperature of 20 degrees C., the temperature at the thermocouple location 41 through 46 are approximately 35 degrees C., or approximately 15 degrees C. higher than the temperature of the surrounding air when steady-state condition is reached. If the entire probe is immersed in water, also maintained at 20 degrees C., the temperature of the probe at the thermocouples 41–46-locations will only be slightly above 20 degrees C. The actual temperatures at the thermocouples locations are found in Table 1. This is because water can remove heat from the probe at much faster rate than air.

TABLE 1

TEMPERATURES AT 6 THERMOCOUPLE LOCATIONS

| | LIQUID LEVEL DEVICE TEMPERATURES (DEG C.) | | |
|---|---|---|---|
| THERMOCOUPLE NO | ALL IN AIR | ALL IN WATER | TC 4, 5 & 6 IN WATER |
| 1 | 34.493 | 20.145 | 33.207 |
| 2 | 34.493 | 20.145 | 31.914 |
| 3 | 34.493 | 20.145 | 28.035 |
| 4 | 34.493 | 20.145 | 20.52 |
| 5 | 34.493 | 20.145 | 20.149 |
| 6 | 34.493 | 20.145 | 20.145 |

NOTE:
BOTH AIR AND WATER TEMPERATURES = 20 DEG C.

Figure 3:
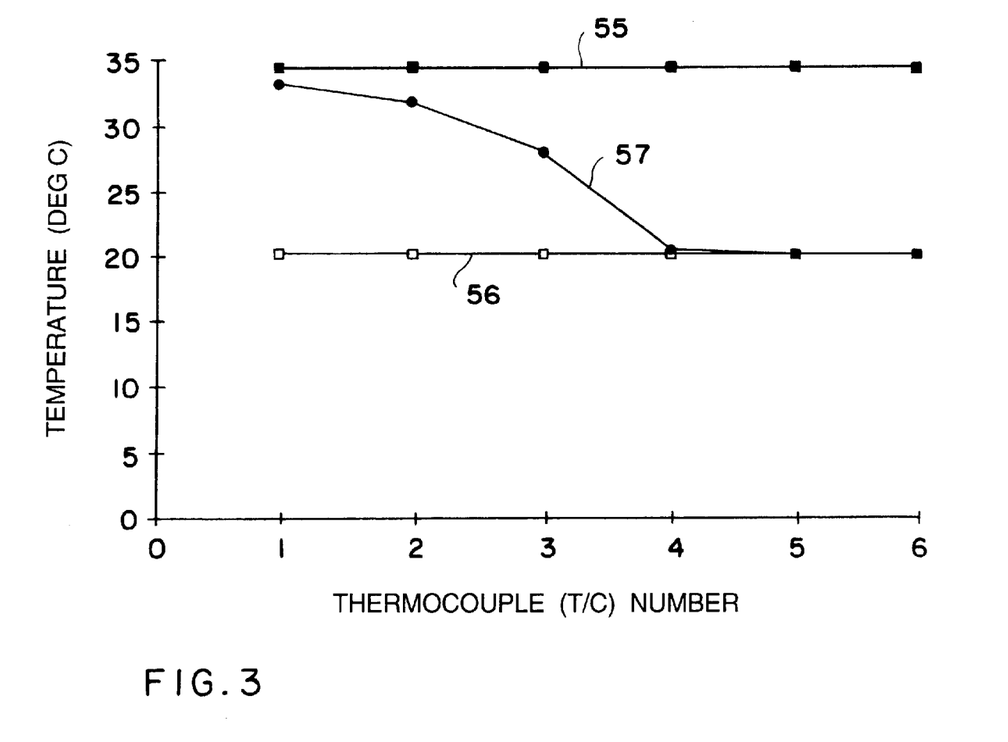
FIG. 3 Probe temperature profile.

So the water requires only a small temperature difference (less than 1 degree C.) to remove the same heating rate as the air has to remove. In FIG. 3, the temperature profile of the probe is shown for three conditions: (1) where the entire probe with 6.0 milliwatts power is in air whose temperature is 20 degrees C. (55), (2) where the probe is completely immersed in water whose temperature is 20 degrees C. (56), and (3) where the probe is immersed in water from thermocouples location 43 to 46, with both air and water maintained at 20 degrees C.

In this example heat is transferred from the surface of the probe to the surrounding medium by free convection. The basic convection heat transfer equation (applicable to both free and forced convection) is $$Q = HA(Tp - Tm) \quad (1)$$

Where Q is the heat transfer rate

H is the convection (free convection in this case) heat transfer coefficient.

A is the area of the probe exposed to the medium

Tp is the temperature of the probe surface exposed to the medium

Tm is the temperature of the medium (air or water in this example)

The temperature difference between the probe surface and the medium is expressed as DT or $$DT = Tp - Tm = Q/(HA) \quad (2)$$

In this example the values of Q and A in equations 1 and 2 are held constant. Only H, which is a measure of the heat transfer coefficient or heat removal efficiency, is varied The higher H is the lower DT is. Water, which is a good heat transfer liquid, usually orders of magnitude better than air in removing heat from the probe both by free convection and forced convection. Therefore it requires a very small DT compared to that required by air in removing the same amount of heating rate or power.

When only liquid levels at discrete locations are desired, such as where the six thermocouples 41–46 are located, the processing of the temperature data becomes relatively simple. The points (thermocouples locations) that are completely immersed in water will indicate a much smaller DT. For example, if thermocouples 44, 45 and 46 are completely immersed in water and thermocouples 41, 42 and 43 are in air, the temperature of the six thermocouples 41–46 will not be constant. The DT's of the thermocouples immersed in water will be much lower. The temperature distribution along the probe when the thermocouples 41, 42 and 43 are in air and when thermocouples 44, 45 and 46 are immersed in water are shown as 57 in FIG. 3. From comparison of the difference in temperatures of the six thermocouples 41–46 to each other, it can be determined which thermocouples or discrete points are immersed in water.

Figure 4:
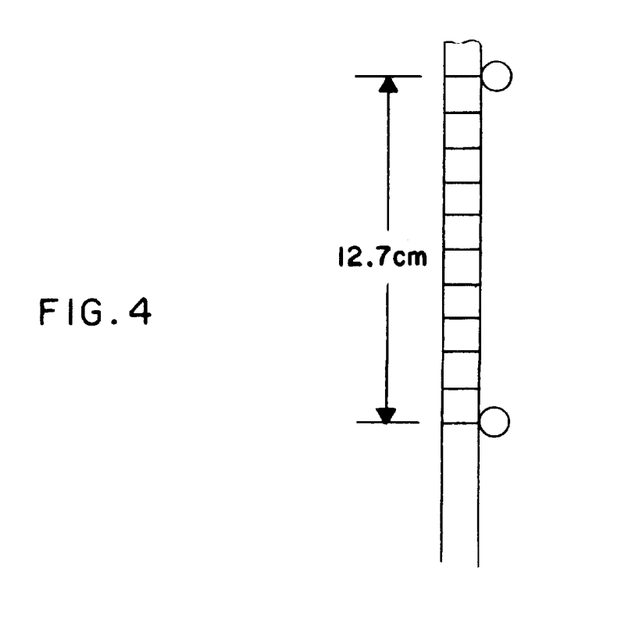
FIG. 4 Division of space thermocouples 43 and 44 into the equal increments for intermediate level reading.
Figure 5:
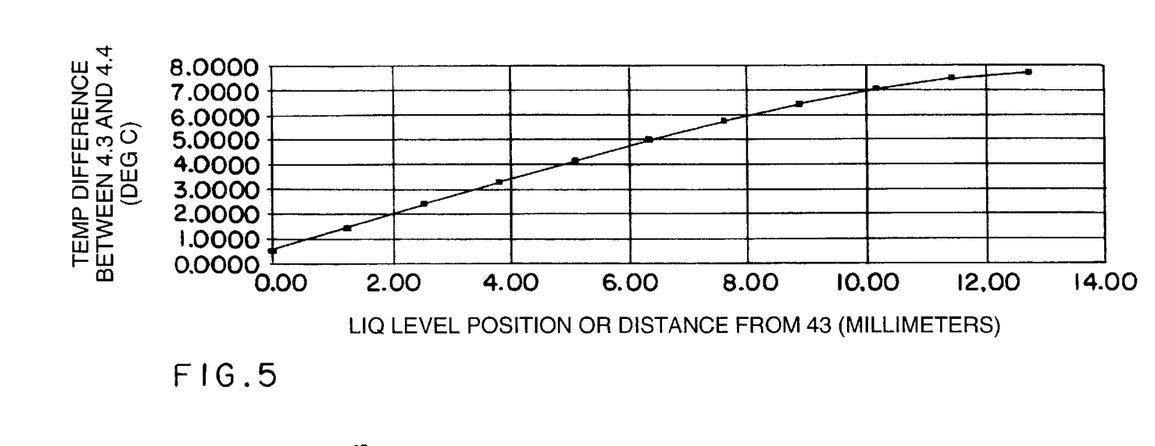
FIG. 5 Temperature difference between thermocouples 43 and 44 versus liquid level position between 43 and 44.

The invention can also be used to determine the liquid levels at intermediate points between the thermocouples locations. Supposing the liquid level is somewhere between thermocouple 43 and thermocouple 44 and it is desired to determine the location of the liquid level within 1.3 millimeter. The space between thermocouple 43 and thermocouple 44 of the probe 40 in the embodiment depicted in FIG. 2 is 12.7 millimeters. If the space is divided into ten equal spaces as shown in FIG. 4, the distance between each intermediate mark is 1.27 millimeters, within the 1.3 millimeter accuracy desired. Referring to FIG. 2 and FIG. 4, as the level of the water is varied from thermocouple 43 (0 distance from thermocouple 43) one intermediate mark at a time to thermocouple 44 (12.7 millimeter distance from thermocouple 43), the actual temperature of thermocouple 43 and thermocouple 44 and the difference between the two temperatures will vary, as shown in Table 2 and FIG. 5. These data can be processed by the microprocessor to

TABLE 2

PROBE TEMPERATURES VS POSITION OF LIQUID LEVEL

| POSITION | BETWEEN TC3 AND TC4 | | |
|---|---|---|---|
| DISTANCE FROM TC3* (MM) | TC3 TEMP DEG C. | TC4 TEMP DEG C. | TC3 – TC4 DEG C. |
| 0.00 | 20.6583 | 20.1445 | 0.5138 |
| 1.27 | 21.6055 | 20.1451 | 1.4604 |
| 2.54 | 22.5432 | 20.1454 | 2.3978 |
| 3.81 | 23.4567 | 20.1460 | 3.3107 |
| 5.08 | 24.3350 | 20.1477 | 4.1873 |
| 6.35 | 25.1703 | 20.1522 | 5.0181 |
| 7.62 | 25.9577 | 20.1644 | 5.7933 |
| 8.89 | 26.6949 | 20.1971 | 6.4978 |
| 10.16 | 27.3829 | 20.2842 | 7.0987 |
| 11.43 | 28.0347 | 20.5194 | 7.5153 |
| 12.70 | 28.7412 | 21.0100 | 7.7312 |

*SEE FIG. 3
NOTE:
AIR AND WATER TEMP = 20 DEG C.

where the actual liquid temperature level is. The thermocouples or equivalent temperature sensors used to measure the temperatures at the various locations will have to be able to provide much more accurate readings than when only discrete temperature levels are being measured. This can be accomplished by using the entire spatial profile of differential rather than absolute thermocouple readings.

The performance characteristics of the invention with other liquids such as gasoline fuel or engine lubrication oil will be similar to that of water. However, in the case of liquids like lubrication oil, which have lower heat removal efficiency than water, but much higher than air, more precision temperature measuring devices and more sophisticated signal conditioning may be required to achieve the same overall performance (signal to noise ratio), because the temperature difference between thermal sensors may not be as pronounced as that when water is used. Instead of keeping the same signal to noise ratio for liquids with different heat removal efficiency by using more accurate temperature sensor (reduce the noise), it is possible to keep the same overall performance by driving the sensor to a given temperature response. However, for some applications like oil/water or liquid/vapor, the choice of driving the sensor to a given temperature might be constrained and temperature sensors with smaller uncertainty need to be used to achieve the same overall performance.

The invention describe herein is one configuration. Other configurations, such as probes in the shape of very thin metallic strips deposited on a printed circuit board may be used. The principle of operation of the probe, which is the novel feature of this invention, applies to other configurations.

Figure 6:
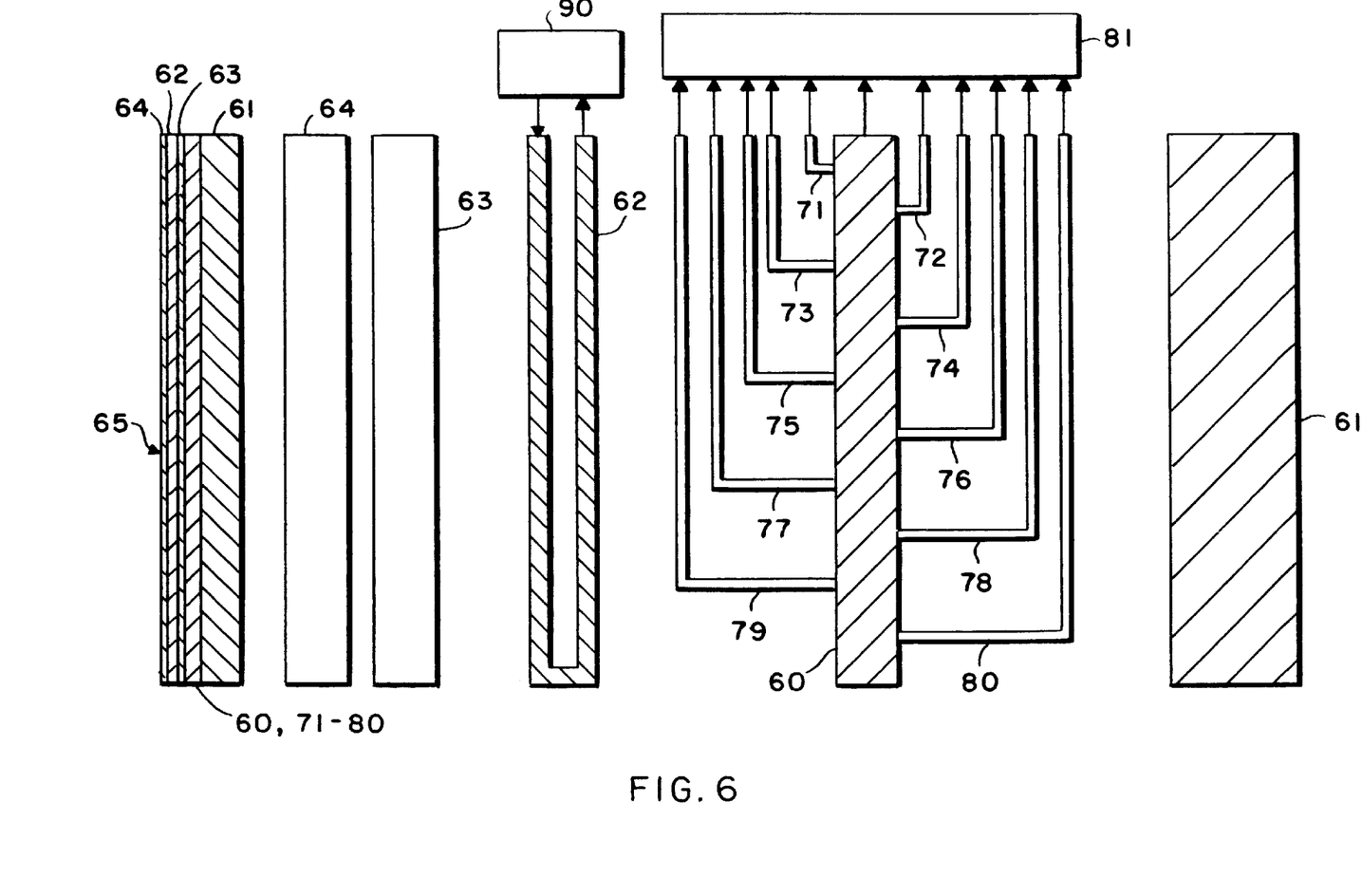
FIG. 6 Another embodiment of invention employing a strip probe.

Another embodiment of the apparatus claimed in this invention is metallic strip version of FIG. 2 which is depicted in FIG. 6. The probe is comprised of a strip of Constantan attached to a fiberglass or a film substrate, or an equivalent printed wiring board material 61, a series of Copper pads (taps) 71 through 80 also attached to board 61 and electrically connected to a Constantan strip 60 to form a series of thermocouple connections herein referred to as the thermocouple network, a heater strip 62 also attached to board 61 but electrically isolated from said thermocouples network with a thin dielectric film 63, and a second thin dielectric film 64 electrically isolating the heater strip 63 from the air or liquid to which the probe is exposed. A DC or AC power source 90, provides pulsed electrical energy to heat the heater strip 62. The thermocouple networks senses the probe temperature at various points along the probe and sends the appropriate electrical differential voltage signals to the microprocessor 81. The precise liquid level location can be determined by processing the signals and determining the corresponding temperature profile along the probe.

The basic embodiment of a simple two-metal strip (e.g. Constantan with Copper taps) eliminates the need for specialized thermocouple electronics. Traditional systems that employ thermocouples use "cold junction compensation" to yield an absolute temperature measurement, then process that data. The tapped strip approach simplifies this to a data set that is entirely composed of differential temperature measurements. The absolute temperature along the strip is not needed for the basic level-sensing applications, but is readily added with a discrete sensor at a single location along the strip if desired. Further, by reducing the probe to an entirely copper interface, the complications and cost of bringing out a dissimilar metal lead is avoided.

The thermocouple junctions in FIG. 6 are formed between the leads end the sensing strip, with suitable thermal, electrical and chemical insulations to keep data clean and the probe stable.

Another variation of the apparatus claimed is a strip design like the one shown in FIG. 6 whereby the constantan strip (60) is used as the heater as well as the common wire for the thermocouples.

Experiments performed on a prototype similar to the configuration described in FIG. 2 indicated similar temperature profile trends as those predicted analytically, although the precision was not close to analytically predicted precision. This is because the sensors used in the prototype did not have the accuracy required for such precision.

Figure 7:
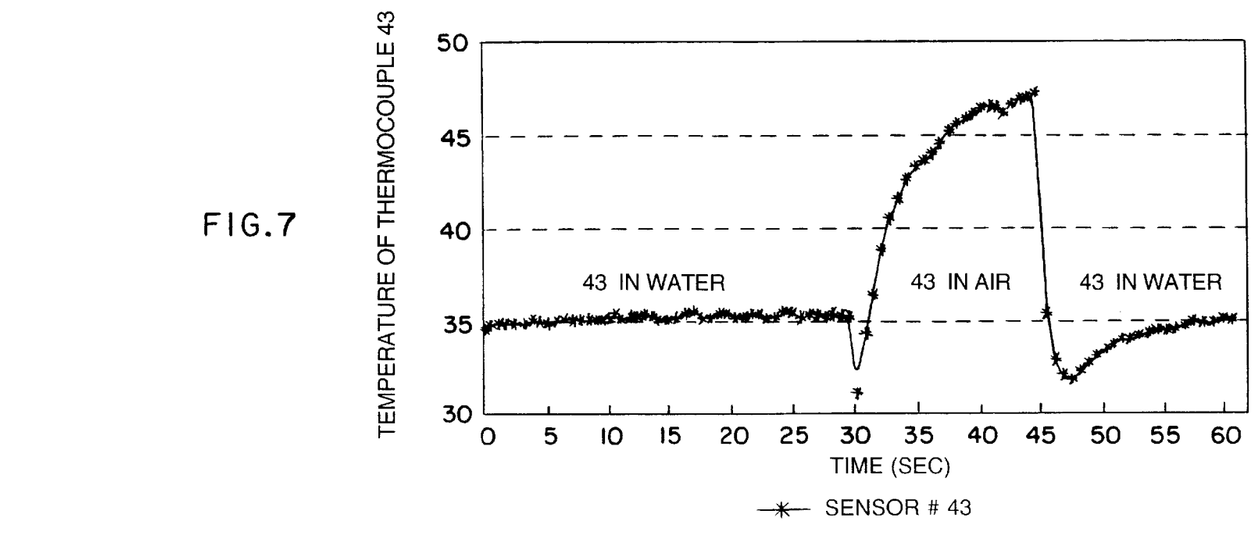
FIG. 7 Temperature behavior of 43 when initially immersed in water and then exposed to air.

The same experiments also indicated that the probe temperature momentarily dips in temperature when exposed to air after being immersed in water, is shown in FIG. 7. This is because the small amount of water entrained on the probe is evaporated, causing the temperature to dip. As the entrained water has been evaporated, the temperature of the probe then rises to the level of that when it is in air. This characteristics of the probe could be employed in the detection of the of ice formation on the external surface of an aircraft, because when the sensor is in ice, it is normally insulated thermally from the surrounding air or water, and the probe temperature is expected to rise.

The invention described (the strip is most useful design) herein will detect ice formation on the external surfaces of an aircraft, by characterizing the signature (detail in the profile) associated with the "Igloo effect" and the various forms of water/slush/ice etc. disturbing the heat flow. When the sensor is covered with ice, it is normally insulated thermally from the surrounding air or water. When the probe is heated, it is expected that its temperature will rise. However, if the amount of power applied to the probe is not too high then at the beginning of power application, the probe temperature will go down since the ice needs power to overcome its latent heat and melt a thin layer of ice. The volume of the melted ice is smaller than the volume of the ice and there will be an air gap between the melted water and the remaining ice. The additional heat that is applied to the probe will raise its temperature to the level expected when a surrounding wall of ice, not in contact with the probe, insulates thermally the melted thin layer of ice from the environment. The transient and steady-state data will be used to infer what is there on any section of the probe.

Figure 8:
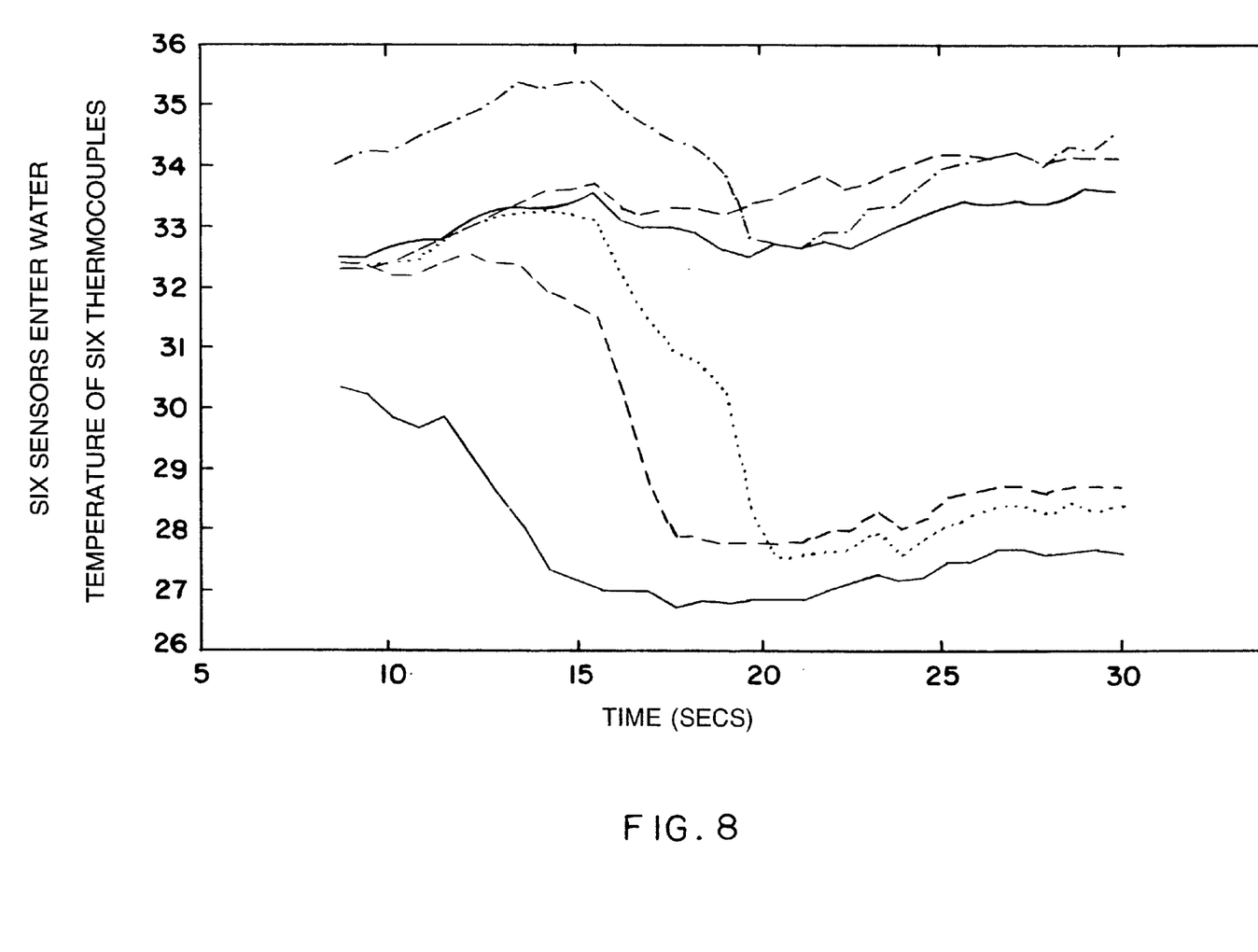
FIG. 8 Temperature behavior of 44, 45 and 46 in water while 41, 42 and 43 in oil.

Further tests of the behavior of the probe when immersed in a body of fluids containing water and oil, wherein the lighter oil stratifies above the water. There is a difference in temperature between that when the probe is in water and when it is in oil, as seen in FIG. 8, where the probe is moved up and down during the various time periods of the experiment.

The principle of operation described in this invention can also be applied to the measurement of the viscosity of a liquid, because viscosity is a key parameter that determines the convective heat transfer efficiency of the liquid. The lower the viscosity of the liquid the more efficiently it can transfer the heat, and the smaller the temperature difference between the heated surface and the liquid (DT) will be. An increase in viscosity of the liquid, which would result in a higher DT, generally indicates that the lubricating quality of the liquid has deteriorated to some degree. As such, a probe that work on the principle of this invention, can be used to determine whether it is time to replace a liquid, such as lubricating oil in an automotive engine.

The invention described herein can also be used to determine the density of a liquid. By measuring the temperature of the liquid and its pressure (with an appropriate pressure measuring device such as pressure transducer) at the same location, it is possible to compute, with a suitable microprocessor, the density of the liquid.

The invention described herein can also be used to determine accurately the liquid or gas temperature at the thermal junctions of the probe. Since the probe responds to the temperature differential between any two thermal junctions along the common strip (Constantan strip in FIG. 6), a reference accurate temperature sensor may be located at a convenient point (or the strip extended to such a point) and the temperature at any other point along the probe is resolvable.

The measurement process for this sensor relies on acquiring data from several sensor taps and reconstructing an analog of the thermal profile along the sensor, as sampled by those taps. The signal from the taps can be digitized in a number of ways, from simply dwelling on each tap in turn until the signal is adequately resolved to briefly reading each tap and increasing the signal resolution as needed through accumulating the results of multiple reads of the tap set. Likewise, the commutation sequence need not follow any specific order; however, noise reduction and ease of data processing are likely to dictate the optimal sampling approach for any given applications. Equally, a simultaneous sampling of all taps, using either multiple parallel converters or multiple sample/hold amplifiers, is workable (although this is likely to be the least cost-effective approach).

I claim:

1. A liquid probe comprising:

a constantan strip secured along the longitudinal extent of one face of an elongated substrate;

a plurality of copper pads secured to said substrate, each pad having one end electrically connected to said constantan strip to form a plurality of thermocouples, said thermocouples being spaced apart over the longitudinal extent of said constantan strip;

a heater strip secured to said substrate with a first thin dielectric film electrically isolating said heater strip from said thermocouples;

a second thin dielectric film secured to said substrate covering said heater strip for electrically isolating said heater strip from air or liquid;

means for applying electrical power to said heater strip, controlled by a power control switch, wherein both ends of said heater strip are connected to said electrical power applying means for heating said heater strip;

one end of said constantan strip and a second end of each copper pad serving as leads of thermocouples which are connected to a microprocessor for processing thermocouple voltage signals and determining the corresponding temperature profile along the probe.

* * * * *